US006325104B1

(12) United States Patent
Yamashita

(10) Patent No.: US 6,325,104 B1
(45) Date of Patent: Dec. 4, 2001

(54) HYDRAULIC CIRCUIT, PRECEDENCE VALVE BLOCK AND OPERATION VALVE BLOCK ASSEMBLY

(75) Inventor: Kouji Yamashita, Tochigi-ken (JP)

(73) Assignee: Komatsu Limited, Tokyo (JP)

( * ) Notice: Subject to any disclaimer, the term of this patent is extended or adjusted under 35 U.S.C. 154(b) by 0 days.

(21) Appl. No.: 09/496,487

(22) Filed: Feb. 2, 2000

(30) Foreign Application Priority Data

Feb. 9, 1999 (JP) .................................................. 11-031137

(51) Int. Cl.[7] ........................................ F16K 11/20
(52) U.S. Cl. ........................................ 137/884
(58) Field of Search ........................................ 137/884

(56) References Cited

U.S. PATENT DOCUMENTS

| | | | | |
|---|---|---|---|---|
| 4,136,713 | * | 1/1979 | Humphreys | 137/884 X |
| 5,277,224 | * | 1/1994 | Hutton et al. | 137/884 X |
| 5,666,994 | * | 9/1997 | Stoll et al. | 137/884 X |
| 5,709,247 | * | 1/1998 | Hutton | 137/884 |
| 5,823,228 | * | 10/1998 | Chou | 137/884 X |
| 5,845,678 | * | 12/1998 | Ishihama et al. | 137/596 |
| 5,915,409 | * | 6/1999 | Kaneko et al. | 137/884 X |
| 5,988,203 | * | 11/1999 | Hutton | 137/884 X |

* cited by examiner

*Primary Examiner*—John E. Ryznic
(74) *Attorney, Agent, or Firm*—Bell Boyd & Lloyd LLC

(57) ABSTRACT

A hydraulic circuit of the present invention comprises a single pump, a precedence valve connected to a discharge pipe of the pump and having a high-pressure side output port and a low-pressure side output port for respectively distributing pressure oil to a high-pressure side circuit and a low-pressure side circuit, a high-pressure specified operation valve connected to one of the output port of the precedence valve, an actuator connected to the high-pressure specified operation valve, a pressure reducing valve connected to the other output port of the precedence valve, low-pressure specified operation valves connected to an output port of the pressure reducing valve, and another actuator connected to the low-pressure specified operation valves. When a load is applied to the actuator connected to the high-pressure specified operation valve, the pressure oil from the pump is supplied to the high-pressure specified operation valve with higher priority. With this feature, it is possible to provide a hydraulic circuit for distributing pressure oil discharged from a single pump to a high-pressure side circuit in which a high-pressure side operation valve is provided and to a low-pressure side circuit in which a low-pressure side operation valve is provided; a simple and inexpensive precedence valve block having a precedence valve for distributing the pressure oil to the high-pressure side circuit and the low-pressure side circuit; and an operation valve block assembly in which a plurality of operation valve blocks are assembled and which is reduced in size, weight and cost without requiring piping and the like.

4 Claims, 9 Drawing Sheets

HYDRAULIC CIRCUIT, PRECEDENCE VALVE BLOCK AND OPERATION VALVE BLOCK ASSEMBLY

BACKGROUND OF THE INVENTION

1. Field of the Invention

The present invention relates to a hydraulic circuit, a precedence valve block and an operation valve block assembly, and more particularly, to: a hydraulic circuit for distributing pressure oil discharged from a single pump to a high-pressure side circuit in which a high-pressure specified operation valve is provided and to a low-pressure side circuit in which a low-pressure specified operation valve is provided; a precedence valve block having a port structure for distributing the pressure oil to the high-pressure side circuit and the low-pressure side circuit; and an operation valve block assembly in which a plurality of operation valve blocks each having an operation valve are assembled.

2. Description of the Related Art

In a vehicle including a construction machine or a working machine such as a bulldozer and the like, valves such as a tilt valve for driving a tilt cylinder or a steering valve for driving a steering motor and a variable capacitance pump connected to a pipe which supplies a pressure oil are mounted. For example, a hydraulic circuit having the valve, an oil pipe and the like is assembled into a block as one unit. In a conventional hydraulic circuit, as shown in FIG. 9 for example, a precedence valve 5 for distributing a pressure oil to a steering circuit 3 and a working machine circuit 4 is disposed in a discharge pipe 2 of a single variable capacitance pump 1.

The precedence valve 5 includes an input port 6 which communicates with the pump 1, two output ports 7 and 8 connected to the steering circuit 3 and the working machine circuit 4, and first and second pilot pressure receiving portions 9 and 10. A pressure oil discharged from the pump 1 passes through the precedence valve 5 and is distributed to the steering circuit 3 and the working machine circuit 4. The steering valve 12 is connected to the output port 7 of the precedence valve 5. Four closed center-type operation valves 13, e.g., lift valves or the like are connected to the output port 8 through pressure compensation valves 14, respectively.

Various kinds of working machine actuators (not shown) such as a lift cylinder, a tilt cylinder and the like are connected to the working machine operation valve 13 through a connection circuit 15, respectively. The discharge pipe 2 of the pump 1 includes a main relief valve 17 for limiting a maximum pressure of the hydraulic circuit. The main relief valve 17 is connected to a drain circuit 19 through a back pressure valve 18. The discharge pipe 2 of the pump 1 includes an unload valve 16. The unload valve 16 unloads when a pressure difference between a pump discharging pressure and a maximum load pressure of the load pressure applied to the actuator exceeds a set value. The unloaded returning pressure oil is discharged to the drain circuit 19.

The pump 1 includes a load sensing valve 11. The load sensing valve 11 is operated such as to keep the pressure difference between discharging pressure of the pump 1 and the maximum load pressure of the load pressure applied to the actuator at a constant value. More specifically, an output pressure of the load sensing valve 11 is introduced into a pressure receiving portion of a servo piston which is a member for controlling a swash plate angle of the pump 1. The servo piston is moved by the discharge pressure of the pump 1 and the output pressure of the load sensing valve 11. The pump swash plate angle is varied by the movement of the servo piston. In the conventional hydraulic circuit, when a load is applied to the steering motor, the flow rate in the output port 7 connected to the steering circuit 4 is increased by the precedence valve 5. At that time, the flow rate to the output port 8 connected to the working machine circuit is reduced.

The hydraulic circuit shown in FIG. 9 is a hydraulic circuit for a bulldozer. This hydraulic circuit can be applied to a hydraulic shovel. In this case, the steering circuit is a running motor circuit having two operation valves. Further, in the working machine circuit, if the number of operation valves is increased or reduced in accordance with the number of the actuators, it is possible to form the precedence circuit using the precedence valve 5 in quite the same manner. Generally, the above-described pressure compensation valve is provided to each of a plurality of flow rate controlling valves and has a function to equalize pressure differences at input side and output side respectively of each of the flow rate controlling valves. With this function, it is possible to output flow rate in accordance with an opening degree of the flow rate controlling valve irrespective of load pressures which are different from one actuator to another actuator. This function is known, and many kinds of connecting method of the operation compensation valve and structure thereof are known. Further, it is common that the operation valve, the pressure compensation valve and the like are connected to each other to form blocks or are assembled into a single block.

In the above-described hydraulic circuit, a maximum pressure of the circuit is set in accordance with an actuator whose load is expected to be the greatest. In the case of the bulldozer, the maximum pressure thereof is set such as to secure a pressure and a flow rate necessary for the steering motor. In the case of a hydraulic shovel also, a relatively great load pressure is applied to a running motor.

A block having an operation valve and the like is produced in accordance with the maximum pressure and the maximum flow rate. In such a case, a block having an operation valve and the like is increased in size and weight. However, checking each and every actuators, there exists some actuators which need not be produced in accordance with the maximum pressure and the maximum flow rate.

If a vehicle such as a construction machine is relatively large, it is easy to mount therein a large operation valve block which realizes the conventional hydraulic circuit. However, in the case of a relatively small vehicle, a mounting space for the operation valve block may be limited. That is, there is a problem that an operation valve block which was produced in accordance with the maximum pressure and the maximum flow rate can not be mounted.

Generally, in the case of a vehicle such as a relatively small construction machine, a steering motor and a running motor require high pressure and large flow rate, and a working machine circuit only requires relatively low pressure and small flow rate. As the vehicle is smaller, a difference between required high pressure and low pressure, and a difference of required flow rate are more remarkable.

However, it is not possible to employ an operation valve specified for low pressure and small flow rate only for the working machine circuit using the conventional hydraulic circuit to reduce the vehicle in size and weight. The conventional hydraulic circuit is a circuit in which input pressures to the steering valve 12 and pressure compensation valves 14 connected to the working machine operation valves 13 are the same. Therefore, even when only the working machine circuit is specified for low-pressure, the pump pressure is increased in accordance with a load pressure of the steering valve 12, and the pressure adversely exceeds the specified pressure of the low-pressure specified operation valve. Further, the pressure oil adversely flows into low-pressure side with high priority, and there is a problem that a vehicle can not be produced with this design.

SUMMARY OF THE INVENTION

The present invention has been accomplished to solve the above conventional problems, and it is an object of the invention to provide a hydraulic circuit for distributing pressure oil discharged from a single pump to a high-pressure side circuit in which a high-pressure side operation valve is provided and to a low-pressure side circuit in which a low-pressure side operation valve is provided; a simple and inexpensive precedence valve having a precedence valve block for distributing the pressure oil to the high-pressure side circuit and the low-pressure side circuit; and an operation valve block assembly in which a plurality of operation valve blocks having a plurality of operation valves are assembled and which is reduced in size, weight and cost without requiring piping and the like.

To achieve the above object, according to a first aspect of the present invention, there is provided a hydraulic circuit comprising: a single pump; a precedence valve connected to a discharge pipe of the pump and having a high-pressure side output port and a low-pressure side output port for respectively distributing pressure oil to a high-pressure side circuit and a low-pressure side circuit; a high-pressure specified operation valve connected to one of the output ports of the precedence valve; an actuator connected to the high-pressure specified operation valve; a pressure reducing valve connected to the other output port of the precedence valve; low-pressure specified operation valves connected to an output port of the pressure reducing valve; and another actuator connected to the low-pressure specified operation valves. When a load is applied to the actuator connected to the high-pressure specified operation valve, the pressure oil from the pump is supplied to the high-pressure specified operation valve with higher priority.

According to the first aspect of the invention, the precedence valve having the two output ports is disposed in the discharge pipe of the single pump, a set pressure is set such that the pressure is applied in accordance with variation in a load pressure of the high-pressure specified operation valve. A passage having, e.g., a large pipe sectional area is brought into communication with one of the output ports, and the high-pressure specified high-pressure side circuit is connected to the one output port. A pipe having a small pipe sectional area is brought into communication with the other output port so that the low-pressure specified low-pressure side circuit is connected to the other output port via the pressure reducing valve. A pressure of the pressure reducing valve is set substantially equal to or slightly lower than a maximum set pressure of the low-pressure side circuit.

With this arrangement, when a load pressure higher than the actuator connected to the low-pressure specified operation valve is applied to the other actuator connected to the high-pressure specified operation valve, the pressure oil from the pump is supplied to the high-pressure specified operation valve with high priority. A pressure oil flowing from the other output port of the precedence valve to the low-pressure side circuit through the pressure reducing valve is reduced in pressure down to a predetermined pressure by the pressure reducing valve and supplied.

In this manner, the pressure oil discharged from the single pump is distributed to the low-pressure side and high-pressure side circuits having different pressure and flow rate through the precedence valve, and the pressure oil supplied to the low-pressure side circuit is reduced in pressure down to the predetermined pressure by the pressure reducing valve. Therefore, excessive pressure oil should not be supplied to the low-pressure side circuit, the low-pressure side circuit can be protected, and the actuator connected to the high-pressure side circuit can be driven with high priority. Further, since the pressure oil to be supplied to the low-pressure side circuit is reduced in pressure down to the predetermined pressure, it is possible to easily form the hydraulic circuit which distributes a pressure oil from a high pressure single pump to the high-pressure side and low-pressure side circuits in which the high-pressure side and low-pressure side operation valves co-exist.

According to a second aspect of the invention, there is provided a hydraulic circuit comprising: a single variable capacitance type single pump having a load sensing valve; a precedence valve connected to a discharge pipe of the pump and having a high-pressure side output port and a low-pressure side output port for respectively distributing pressure oil to a high-pressure side circuit and a low-pressure side circuit; a high-pressure specified operation valve having a pressure compensation valve connected to one of the output port of the precedence valve; an actuator connected to the high-pressure specified operation valve; the pressure compensation valve being a valve for outputting a high-pressure side LS pressure; a pressure reducing valve connected to the other output port of the precedence valve; low-pressure specified operation valves having another pressure compensation valve connected to the output port of the pressure reducing valve; another actuator connected to the low-pressure specified operation valves; the pressure compensation valve being a valve for outputting a low-pressure side LS pressure; and a high-pressure precedence circuit for comparing the high-pressure side LS pressure and the low-pressure side LS pressure and outputting higher one of the pressures. When a pressure difference between a discharge pressure of the pump and the high-pressure side LS pressure is in a given range, pressure oil from the pump is supplied to the high-pressure specified operation valve with higher priority.

With this arrangement, the output port on the side of the high-pressure circuit of the precedence valve connected to the discharge pipe of the single variable capacitance pump gives higher priority to the flow rate of the pressure oil from the single pump. The output port on the side of the low-pressure circuit of the precedence valve reduces the flow rate of the pressure oil from the single pump only by an amount of flow flowing to the output port on the side of the high-pressure circuit, and the pressure reducing valve reduces the discharge pressure of the pump which increases in accordance with the high-pressure circuit side down to the predetermined pressure. When a pressure difference between the discharge pressure from the pump and the high-pressure side LS pressure is within a given range, the precedence valve supplies the pressure oil from the single variable capacitance type pump to the high-pressure specified operation valve with high priority.

Therefore, in the second aspect of the invention, the pressure oil is supplied from the output port on the side of the high-pressure circuit of the precedence valve to the actuator connected to the high-pressure specified operation valve through the pressure compensation valve, and the pressure oil is supplied from the output port on the side of the low-pressure circuit of the precedence valve through the pressure reducing valve and the pressure compensation valve to the actuator connected to the low-pressure specified operation valve. At that time, the pressure compensation valve of the high-pressure specified operation valve is operated in accordance with variation in a load pressure of the actuator disposed in the high-pressure side circuit, thereby controlling the flow rate of the pressure oil discharged from the high-pressure specified operation valve to the predetermined flow rate.

Meanwhile, when the actuator disposed in the low-pressure side circuit is driven, the pressure compensation valve of the low-pressure specified operation valve operates the corresponding pressure compensation valve, and the pressure oil discharged from the low-pressure specified operation valve is controlled to the predetermined flow rate. When actuators disposed in a plurality of low-pressure side circuits, the pressure compensation valve of the low-pressure side operation valve operates such that the pressure becomes equal to the highest load pressure among the plurality of actuators.

With this arrangement, the highest load pressure between the high-pressure side LS pressure and the low-pressure side LS pressure is supplied to the load sensing valve of the pump through the high-pressure precedence circuit. The load sensing valve controls the pump discharge amount. The pressure oil discharged from the pump is supplied to the high-pressure side circuit through the precedence valve with high priority. On the other hand, the pressure oil flowing from the precedence valve to the low-pressure side circuit through the pressure reducing valve is reduced in pressure to the predetermined pressure by the pressure reducing valve and supplied.

Therefore, in addition to the working effect of the first aspect of the invention, even when the load is varied, it is possible to supply the pressure oil of the pump always at constant flow rate to the high-pressure side and low-pressure side circuits by each of the pressure compensation valves, and it is possible to distribute the pressure oil flowing to the precedence valve with simple and inexpensive structure and with appropriate ratio.

A hydraulic circuit for distributing a pressure oil to the high-pressure side and low-pressure side circuits according to a third aspect of the invention is of a single block structure. That is, according to the third aspect of the invention, the precedence valve block which is the single block structure is of substantially rectangular parallelepiped shape and provided in one surface thereof with a pump pressure input port, comprising a main relief valve for limiting a pressure of the pump pressure input port, a precedence valve for outputting a pressure oil introduced into the pump pressure input port into two ports, and a pressure reducing valve for reducing output pressure of one of the two ports. The precedence block is provided in a surface adjacent the one surface with an output port of the pressure reducing valve. The other one of the two ports is formed in a surface opposed to the surface having the output port of the pressure reducing valve. The main relief valve and the precedence valve are disposed in a surface which is substantially parallel to the surface having the other port. And the precedence valve and the pressure reducing valve are disposed in a surface which is substantially perpendicular to the surface having the other port.

According to the third aspect of the invention, the pump pressure input port, the main relief valve for limiting the pressure of the pump pressure input port, the precedence valve for distributing pressure oil, and the pressure reducing valve for reducing pressure of the pressure oil flowing into the low-pressure side circuit are assembled in the precedence valve block having a port structure for distributing the pressure oil to the high-pressure specified operation valve and the low-pressure specified operation valve.

Therefore, it is possible to easily and inexpensively form a circuit structure using different pressure, and it is possible to reduce the circuit structure in both size and weight. Since such a precedence valve is small in size and light in weight, a space where a working machine is placed can be reduced, and the precedence valve block can easily be carried.

A precedence block according to a fourth aspect is provided with an unload valve therein, and a plane formed by the unload valve and the pressure reducing valve is substantially parallel to a plane formed by the main relief valve and the precedence valve.

According to the fourth aspect, it is possible to dispose an unload valve for using different pressure in the precedence valve. Therefore, it is possible to further reduce the space where the working machine is placed, and to easily mount the working machine in a small vehicle.

According to a fifth aspect of the invention, the precedence valve comprises a combination of operation valve blocks in which a plurality of operation valves are incorporated. That is, according to the fifth aspect of the invention, the operation valve block assembly, comprises a high-pressure specified operation valve block having a high-pressure specified operation valve, a low-pressure specified operation valve block having low-pressure specified operation valve, and a precedence valve block. The precedence valve block is disposed between the high-pressure specified operation valve block and the low-pressure specified operation valve block, the precedence valve block includes a precedence valve, a pressure reducing valve and a pump pressure input port. The precedence valve is a valve for outputting pressure fluid introduced into the pump pressure input port into two output ports. One of the two output ports is formed in an end surface (high-pressure side end surface, hereinafter) connected to the high-pressure specified operation valve block. The other one of the two output ports is connected to the pressure reducing valve, and an end surface (low-pressure side end surface, hereinafter) connected to the low-pressure specified operation valve block is provided with pressure fluid output from the pressure reducing valve.

According to the fifth aspect of the invention, the precedence valve block of the operation valve block assembly is of a simple structure having the pump pressure input port provided in one side surface and the two pump input ports provided in a surface connected to the high-pressure side operation valve block. Therefore, it is easy to connect the high-pressure specified and low-pressure specified operation valve blocks, and it is possible to freely set specified and the like of the operation valve in each of the operation valve block. Piping is unnecessary in the assembly of each of the operation valve blocks, and it is possible to connect the blocks easily, and it is possible to reduce the operation valve block assembly both in size and weight.

According to a sixth aspect of the invention, in the operation valve block assembly, a high-pressure side pressure compensation valve is disposed in the high-pressure specified operation valve block, a low-pressure side pressure compensation valve is disposed in the low-pressure specified operation valve block, the output port formed in the high-pressure side end surface of the precedence valve block is in communication with pump pressure introducing ports of the high-pressure side pressure compensation valve, a signal output port of the high-pressure side pressure compensation valve is in communication with a pilot pressure receiving portion of the precedence valve, and the output port formed in the low-pressure side end surface of the precedence block is in communication with pump pressure introducing ports of the low-pressure side pressure compensation valve.

According to the sixth aspect, when the pressure compensation valve is disposed in each of the high-pressure specified and low-pressure specified operation valve blocks, the output port formed in the high-pressure side end surface of the precedence valve block having the precedence valve is brought into communication with the pump pressure introducing port of the high-pressure side pressure compensation valve, and the input port to the pilot pressure receiving portion of the precedence valve is brought into communication with the signal output port of the high-pressure side pressure compensation valve. The output port formed in the low-pressure side end surface of the precedence valve block is brought into communication with the pump pressure introducing port of the low-pressure side pressure compensation valve, the connecting surfaces of the precedence valve block is connected between the high-pressure specified operation valve block and the low-pressure specified operation valve block, and each of the connecting surfaces are connected and fixed. Therefore, in addition to the working effect of the fifth aspect, since the operation valve block assembly is small in size and light in weight, it is possible to further reduce the space where the working machine is placed, and to easily mount the working machine in a small vehicle, and the precedence valve block can easily be carried.

DETAILED DESCRIPTION OF THE PREFERRED EMBODIMENT

A preferred embodiment of the present invention will be explained concretely based on the accompanying drawings below.

Figure 1:
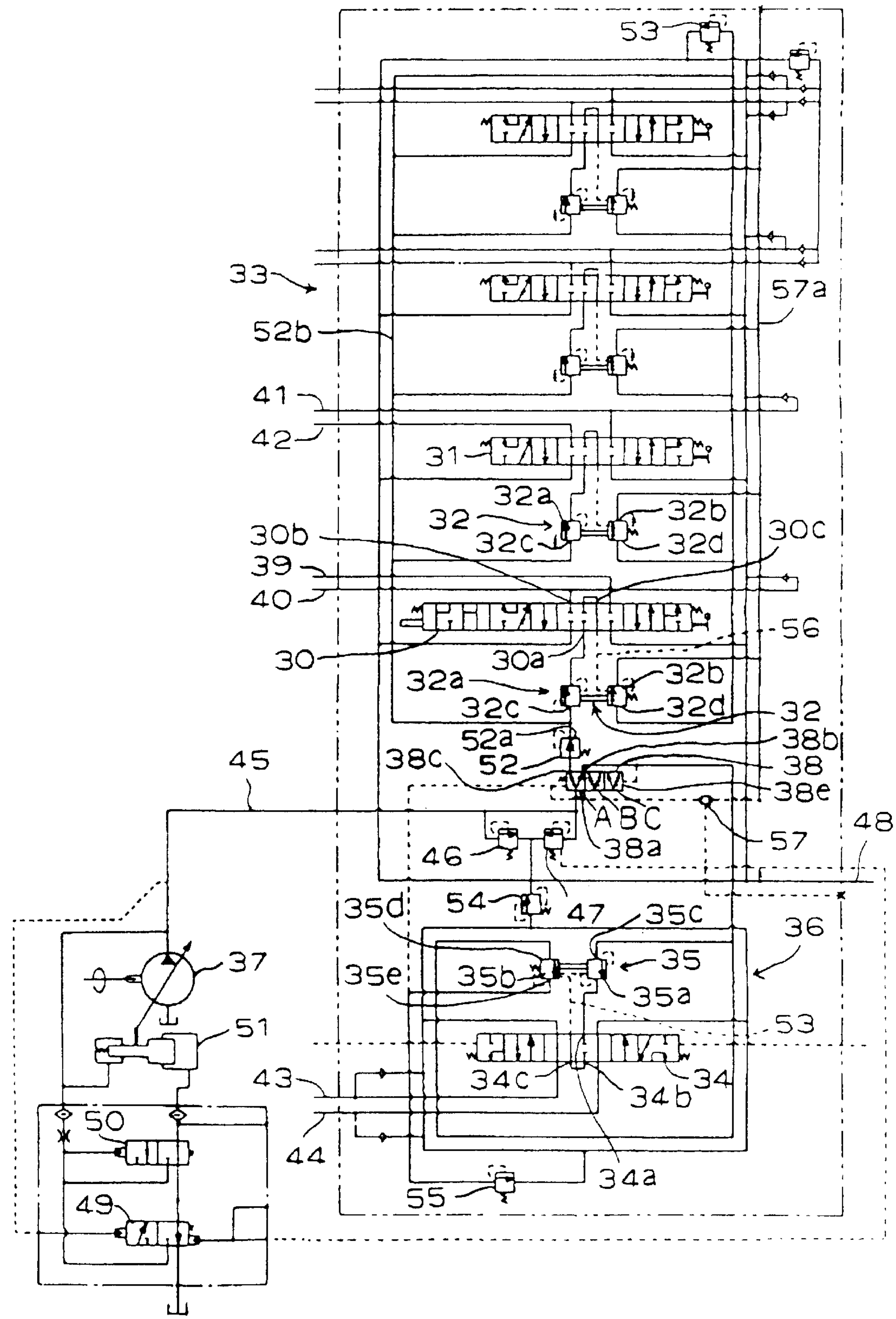
FIG. 1 is a hydraulic circuit diagram which is a typical embodiment of the present invention.

FIG. 1 is a hydraulic circuit diagram which is a typical embodiment of the present invention. The hydraulic circuit includes a variable capacitance type pump 37. A discharge pipe of the pump 37 includes a precedence valve 38. The precedence valve 38 is for bifurcating a discharged pressure oil of the pump 37 into two pipes. One of the bifurcated pipes includes a pressure reducing valve 52. An output side pipe 52*b* of the pressure reducing valve 52 includes low-pressure specified operation valves 30 and 31. Precedence valves 32 and 32 are respectively connected to the low-pressure specified operation valves 30 and 31. The number of the low-pressure specified operation valves and usage thereof differ depending upon kinds of vehicle to which the hydraulic circuit is applied. For example, when the vehicle is a bulldozer, the operation valves are tilt valve, a lift vale or the like. When the vehicle is a hydraulic shovel, the operation valves are a boom valve, an arm valve or the like.

The other pipe of the precedence valve 38 includes a high-pressure specified operation valve 34. The high-pressure specified operation valve 34 includes a pressure compensation valve 35. Like the low-pressure specified operation valves, the number of the high-pressure specified operation valves 34 and usage thereof differ depending upon kinds of vehicle to which the hydraulic circuit is applied. For example, when the vehicle is a bulldozer, the operation valve is a steering valve. When the vehicle is a hydraulic shovel, the operation valve is a running valve or the like. A cylinder and a motor which are actuators are connected to the low-pressure and high-pressure specified operation valves, respectively.

In the present specification, one of the two output pipes of the precedence valve 38 having a pressure reducing valve 52 and the low-pressure specified operation valves 30 and 31 is called a low-pressure side circuit 33, and the other one having the high-pressure specified operation valve 34 is called a high-pressure side circuit 36.

A main relief valve 46 and an unload valve 47 are connected to a discharge pipe 45 of the single pump 37. Output sides of the main relief valve 46 and the unload valve 47 are connected to a drain circuit 48. A back pressure valve 54 connected to the drain circuit 48 determines a minimum pressure on the returning side of the high-pressure specified operation valve 34 (outputting side to the drain circuit 48). The unload valve 47 unloads when a pressure difference between a discharge pressure of the pump 37 and a signal pressure (maximum LS pressure, hereinafter) determined in accordance with a maximum load pressure in all the hydraulic circuits exceeds a set value.

The single pump 37 is a swash plate piston pump, and includes a load sensing valve 49. The load sensing valve 49 controls the discharge pressure of the pump 37 such that a pressure difference between the discharge pressure and the maximum LS pressure is constant. More specifically, the pump swash plate angle is changed by operating a servo piston 51 through a pump control valve 50, thereby controlling the pump discharging amount.

The precedence valve 38 includes three ports, i.e., an input port 38*a*, a high-pressure side output port 38*b* and a low-pressure side output port 38*c*. Here, the terms "high-pressure side" and "low-pressure side" are names appropriately used depending upon kinds of valves to be connected. Pressure of the output ports 38*b* and 38*c* is not bifurcated into high-pressure and low-pressure by the precedence valve 38. The discharge pipe 45 of the pump 37 is connected to the input port 38*a*. The high-pressure specified operation valve 34 is connected to the high-pressure side output port 38*b* of the precedence valve 38 through the pressure compensation valve 35. An input port of the pressure reducing valve 52 is connected to the low-pressure side output port 38*c* of the precedence valve 38.

First, the high-pressure side circuit 36 will be explained.

The pressure compensation valve 35 connected to the high-pressure specified operation valve 34 comprises a flow control valve 35*a* and a pressure reducing valve 35*b*. This pressure compensation valve 35 maintains balance in a position where the following two pressure differences are equal to each other, and its opening area is determined. One of the two pressure differences is a pressure difference between an upstream side pressure of the flow control valve 35*a* and the high-pressure side LS pressure. The other pressure difference is a pressure difference between a downstream side pressure of the flow control valve 35*a* and a load pressure of the actuator connected to the operation valve 34. In the present embodiment, the high-pressure side LS pressure is an output pressure itself of the pressure reducing valve 35*b*. A downstream portion of the flow control valve 35*a* is connected to a pump pressure introducing port 34*a* of the high-pressure specified operation valve 34. A pressure oil passing through the flow control valve 35*a* flows into a connection circuit 43 or 44 which connects the actuator (not shown) in accordance with an operational position of the high-pressure specified operation valve 34. Since this type of pressure compensation valve is known, detailed explanation thereof will be omitted.

The signal output port 35*e* of the pressure reducing valve 35*b* is introduced toward a spring chamber of the precedence valve 38 as a pilot pressure. The signal output port 35*e* is connected to the drain circuit 48 through a load sensing relief valve 55 and the back pressure valve 54.

Next, the low-pressure side circuit 33 will be explained.

The low-pressure specified operation valves 30, 31 and the like are connected to an output port 52*a* of the pressure reducing valve 52 through the pressure compensation valve 32, respectively. The pressure reducing valve 52 reduces the pressure oil sent from the precedence valve 38 down to a predetermined pressure in accordance with the low-pressure specified operation valve. Each of the pressure compensation valves 32 connected to the low-pressure specified operation valves 30 and 31 comprises a flow control valve 32*a* and a pressure reducing valve 32*b*. Output pressure oil of the pressure reducing valves 32*b* of all of the pressure compensation valves 32 of the low-pressure side circuit 33 is in communication with a pipe 57*a*. The pressure in the pipe 57*a* is the low-pressure side LS pressure.

Each of the pressure compensation valves 32 connected to the low-pressure specified operation valves 30 and 31 comprises the flow control valve 32*a* and the pressure reducing valve 32*b*. This pressure compensation valve 32 maintains balance in a position where the following two pressure differences are equal to each other, and its opening area is determined. One of the two pressure differences is a pressure difference between an upstream side pressure of the flow control valve 32*a* and the high-pressure side LS pressure. The other pressure difference is a pressure difference between a downstream side pressure of the flow control valve 32*a* and a load pressure of the actuator connected to the operation valves 30 and 31. In the present embodiment, the high-pressure side LS pressure is an output pressure itself of the pressure reducing valve 32*b*. A downstream portion of the flow control valve 32*a* is connected to a pump pressure introducing port 30*a* of the low-pressure specified operation valves 30 and 31. A pressure oil passing through the flow control valve 32*a* flows into connection circuits 39, 40, 41 and 42 which connects the actuator (not shown) in accordance with an operational position of the low-pressure specified operation valves 30 and 31. Since this type of pressure compensation valve is known, detailed explanation thereof will be omitted.

The low-pressure side LS pressure pipe 57*a* is connected to a shuttle valve 57. The shuttle valve 57 compares the low-pressure side LS pressure and an output pressure of the pressure reducing valve 35*b* of the pressure compensation valve 35 connected to the high-pressure specified operation valve 34, and outputs higher one of the pressure. The pressure output here is the maximum LS pressure. As described above, the maximum LS pressure is supplied to the unload valve 47 and the load sensing valve 49. The load sensing valve 49 operates the servo piston 51 such as to keep a pressure difference between the discharge pressure of the pump 37 and the maximum LS pressure constant. The swash plate angle of the pump is changed by operating the servo piston 51, thereby controlling the discharge amount of the pump.

The unload valve 47 outputs the pressure oil discharged from the pump 37 to the drain circuit 48 when the pressure difference between the discharge pressure of the pump 37 and the maximum LS pressure exceeds a set value. Normally, the hydraulic circuit is designed such that a set pressure difference of the unload valve 47 is slightly greater than a set pressure difference of the load sensing valve 49.

The precedence valve 38 includes a first pilot pressure receiving portion 38*d* which is in communication with the pressure reducing valve 35*b* of the pressure compensation valve 35, and a second pilot pressure receiving portion 38*e* which is in communication with a signal output line of the high-pressure side output port 38*b* of the precedence valve 38. When the precedence valve 38 is in a first position A, the pressure reducing valve 52 is brought into communication with a passage having a small flow pipe sectional area including a throttle in the precedence valve 38, and the high-pressure specified operation valve 34 is brought into communication with a passage having a great flow pipe sectional area. When the precedence valve 38 is in a third position C, the pressure reducing valve 52 is brought into communication with a passage having a great flow pipe sectional area, and the high-pressure specified operation valve 34 is brought into communication with a passage having a small flow pipe sectional area. The flow rate of the pressure oil flowing to the precedence valve 38 is reduced by the passage having the throttle, and the oil flows into the passage having the great flow pipe sectional area with high priority. In FIG. 1, the precedence valve 38 is indicated with symbols of three positions, but flow pipe sectional areas of the first position A, a second position B and the third position C are varied continuously.

The precedence valve 38 is switched into a direction to assume the first position A by a spring force and an output pressure of the pressure reducing valve 35*b* of the pressure compensation valve 35 connected to the high-pressure specified operation valve 34. Further, the precedence valve 38 is switched into a direction to assume the third position C by a pressure of the high-pressure side circuit 36 which is the other output pressure of the precedence valve 38. That is, the position of the precedence valve 38 is switched by the spring force, the output pressure of the pressure reducing valve 35*b* and the pressure difference of the high-pressure side circuit 36. In the present invention, the spring force is set greater than a set pressure difference of the load sensing valve. With this design, when the high-pressure specified operation valve 34 is operated, the precedence valve 38 operates to bring the precedence valve 38 into the first position A irrespective of a state of the low-pressure side pipe 52*b*. By changing the areas of the pilot pressure receiving portions of the precedence valve 38 into different values instead of increasing the spring force, the flow rate can likewise be sent to the high-pressure specified operation valve 34 with high priority.

Next, the operation of the hydraulic circuit according to the present invention will be explained.

First, a case where a load is applied only to the actuator connected to the low-pressure side circuit 33 is described. When the low-pressure specified operation valve 30 is operated, a load pressure is generated in the actuator connected to the low-pressure specified operation valve 30. In accordance with this load pressure, a pressure corresponding to the load pressure from the pressure reducing valve 32*b* of the pressure compensation valve 32 connected to the low-pressure specified operation valve 30 is output as a low-pressure side LS pressure. When a plurality of actuators connected to the low-pressure side circuit 33 are operated, a pressure corresponding to the maximum load of the actuators is the low-pressure side LS pressure. The low-pressure side LS pressure determines a set pressure of all of the pressure compensation valves 32 which exist in the low-pressure side circuit 33. With this arrangement, the flow rate which has passed through the pressure reducing valve 52 is distributed only in accordance with the opening degree of each of the low-pressure specified operation valves 30 and 31 irrespective of a load pressure of each of the actuators.

Further, the low-pressure side LS pressure is introduced into the shuttle valve 57. Here, since a load is not applied to the high-pressure side circuit 36, the low-pressure side LS pressure is output as the maximum LS pressure. As described above, the maximum LS pressure is introduced into the load sensing valve 49. The load sensing valve 49 controls the discharge pressure of the pump 37 such that the pressure difference between the maximum LS pressure and the discharge pressure of the single pump 37 is always constant. Here, the set pressure of the pressure reducing valve 52 is set substantially equal to or slightly lower than a set pressure of the relief valve 53 which determines the maximum pressure of the low-pressure side circuit 33. That is, when a load pressure is applied only to the actuator of the low-pressure side circuit 33, the pressure reducing valve 52 allows the flow rate to pass without reducing the pressure. Therefore, the pressure difference between the low-pressure side LS pressure and the discharge pressure of the pump 37 is controlled to be constant.

Next, a case where a load is applied only to the actuator connected to the high-pressure side circuit 36 will be explained.

When the high-pressure specification operation valve 34 is operated, a load pressure is generated in the actuator connected to the high-pressure specified operation valve 34. In accordance with this load pressure, a pressure corresponding to the load pressure is output from the pressure reducing valve 35*b* of the pressure compensation valve 35 connected to the high-pressure specified operation valve 34. In the embodiment shown in FIG. 1, one actuator is connected to the high-pressure side circuit 36. Therefore, the output pressure of the pressure reducing valve 35*b* becomes the high-pressure side LS pressure. The high-pressure side LS pressure determines a set pressure of the pressure compensation valve 35. The high-pressure side LS pressure is introduced into the shuttle valve 57. Since no load is applied to the low-pressure side circuit 33 here, the high-pressure side LS pressure is output as the maximum LS pressure. As described above, the maximum LS pressure is introduced into the load sensing valve 49. The load sensing valve 49 controls the discharge pressure of the pump 37 such that the pressure difference between the maximum LS pressure and the discharge pressure of the single pump 37 becomes always constant. That is, when the load pressure is applied only to the actuator of the high-pressure side circuit 36, the difference between the high-pressure side LS pressure and the discharge pressure of the pump 37 is controlled to be constant.

Next, a case where both the actuators of the high-pressure side circuit 36 and the low-pressure side circuit 33 are operated will be explained.

When the load pressure applied to the actuator connected to the high-pressure side circuit is sufficiently high, if the high-pressure side LS pressure and the low-pressure side LS pressure are compared by the shuttle valve 57, the high-pressure side LS pressure is higher. Therefore, the high-pressure side LS pressure is output as the maximum LS pressure. At that time, the discharge pressure of the pump 37 is determined by the load pressure of the actuator connected to the high-pressure side circuit 36. That is, the load sensing valve 49 operates such that the difference between the high-pressure side LS pressure and the discharge pressure of the pump 37 is constant, not by the low-pressure side circuit 33. In the low-pressure side circuit 33, the discharge pressure of the pump 37 which increases in accordance with the high-pressure side circuit 36 is reduced by the pressure reducing valve 52. The pump pressure of the low-pressure side circuit 36 is reduced by the pressure reducing valve 52 and becomes constant. At that time, all of the pressure compensation valves of the high-pressure side circuit 33 are set by the low-pressure side LS pressure determined by the maximum load pressure among the actuator connected to the low-pressure side circuit 33.

The low-pressure side LS pressure is different as compared with a case where the high-pressure side circuit 36 is not operated, but in the low-pressure side circuit 33, the flow rate is maintained by the distribution function in accordance with the opening degree of each of the low-pressure specified operation valves 30 and 31. When both the actuators of the high-pressure side circuit 36 and the low-pressure side circuit 33 are operated, the precedence valve 38 assumes the first position A as described above. Assuming that there is no precedence valve 38, since the pressure in the low-pressure side circuit 33 is lower, the flow rate of the pump 37 flows toward the low pressure side circuit 33 which is low. That is, the precedence valve 38 has a function for distributing and supplying a necessary flow rate to the high-pressure side circuit 36 which is higher in pressure, with high priority.

According to the present embodiment, a pressure oil discharged from the single pump 37 is distributed to the low-pressure side and high-pressure side circuits 33 and 36 having different pressure and flow rate through the precedence valve 38, and the pressure oil to be supplied to the low-pressure side circuit 33 is reduced in pressure down to a predetermined pressure by the pressure reducing valve 52. Therefore, excessive pressure oil is not supplied to the low-pressure side circuit 33, the pressure oil can sufficiently be supplied to the high-pressure side circuit 36, and it is possible to drive the actuator connected to the high-pressure side circuit 36 by the single pump 37, with high priority.

Figure 2:
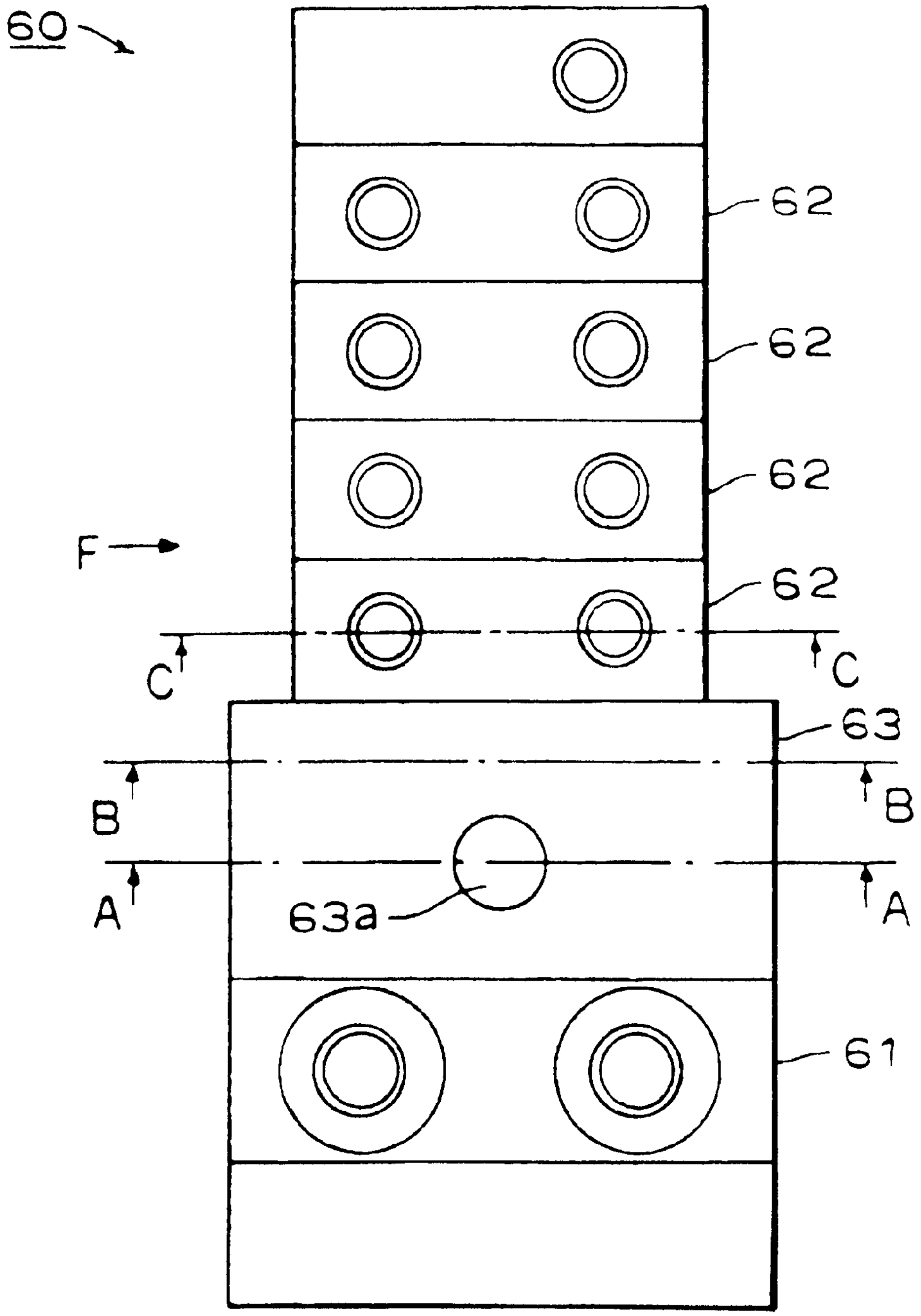
FIG. 2 is a front view showing an operation valve block assembly.

Next, a structure of the present invention will be shown in FIGS. 2 to 7. FIG. 2 shows a region surrounded by phantom lines in FIG. 1 as a structure as an operation valve block assembly 60. The operation valve block assembly 60 comprises a plurality of low-pressure specified operation valve blocks 62, a precedence valve block 63, and a high-pressure specified operation valve block 61 secured and connected by a bolt or the like.

The precedence valve block 63 includes the precedence valve 38, the main relief valve 46, the unload valve 47, and the back pressure valve 54. The main relief valve 46 is disposed in the precedence valve block 63 such that the main relief valve 46 is in communication with the pump pressure input port 38*a* and the tank port. The precedence valve 38 is disposed in the precedence valve block 63 substantially in parallel to the main relief valve 46 within a substantially the same horizontal plane with the main relief valve 46. In a plane which is in parallel to a plane including the main relief valve 46 and the precedence valve 38, the pressure reducing valve 52 disposed in parallel to the precedence valve 38 at a portion perpendicular to a plane including the precedence valve 38. The unload valve 47 disposed in parallel to the pressure reducing valve 52 is disposed in a plane including the pressure reducing valve 52, and the back pressure valve 54 disposed in parallel to the unload valve 47 is disposed in a plane including the pressure reducing valve 52 and the unload valve 47.

Figure 3:
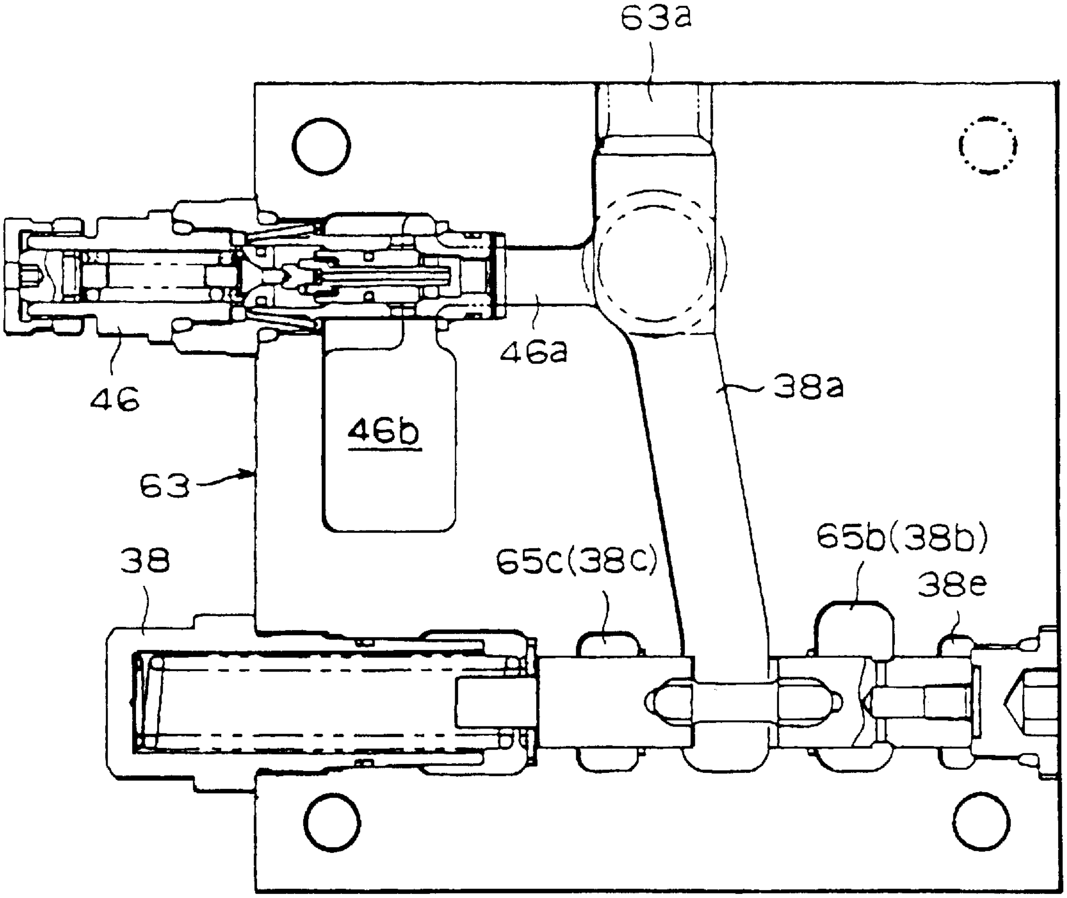
FIG. 3 is a sectional view taken along the line A—A in FIG. 2.
Figure 4:
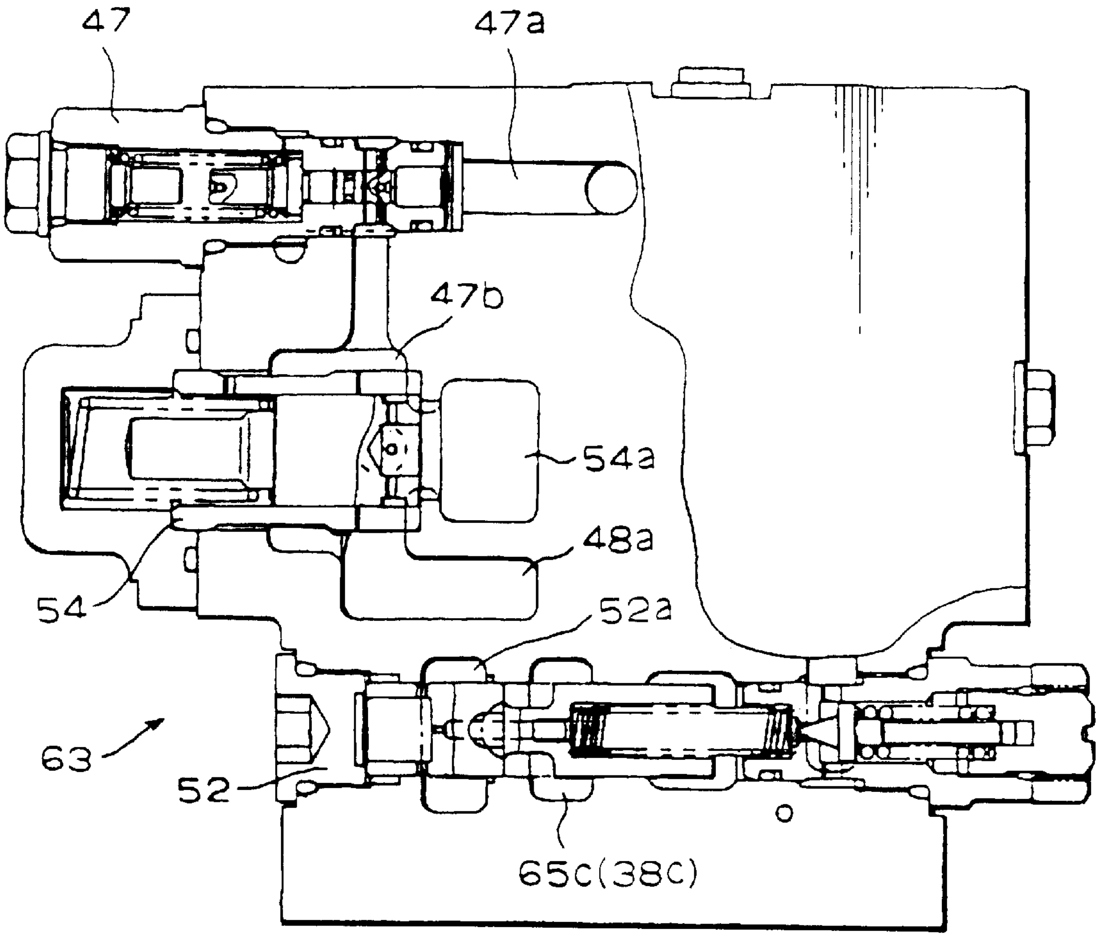
FIG. 4 is a sectional view taken along the line B—B in FIG. 2.

FIG. 3 is a sectional view taken along the line A—A in FIG. 2 which shows the precedence valve 38 of the precedence valve block 63. FIG. 4 is a sectional view taken along the line B—B in FIG. 2 which shows the pressure reducing valve 52 of the precedence valve block 63.

The pressure oil discharged from the pump 37 is introduced into a pump port 63*a* of the precedence valve block 63. The pressure oil introduced into the pump port is brought into communication with the input port 38*a* of the precedence valve 38. The pressure oil brought into communication with the input port 38*a* is output to a high-pressure side output port 65*b* (corresponding to the 38*b*) connected to the high-pressure side circuit, or a low-pressure side output port 65*c* (corresponding to 38*c*) connected to the low-pressure side circuit. The high-pressure side output port 65*b* is connected toward the front in FIG. 3. In FIG. 2, the high-pressure side output port 65*b* is connected toward the high-pressure specified operation valve block 61. In FIG. 3, the low-pressure side output port 65*c* is connected backward. The low-pressure side output port 65*c* is connected to the 65*c* in FIG. 4. The pressure oil introduced into the 65*c* which serves also as an input port of the pressure reducing valve is reduced in pressure by the pressure reducing valve 52. The pressure oil reduced in pressure is output from the output port 52*a*. The output port 52*a* is connected to backward in FIG. 4. In FIG. 2, the output port 52*a* is connected to the low-pressure specified operation valve block 62.

In FIG. 3, the discharge pressure oil of the pump 37 introduced to the pump port is introduced into the main relief valve 46 through a pipe 46*a* connected to the input port 38*a* of the pressure reducing valve 38. The output pressure oil of the main relief valve 46 is discharged to the port 46*b*. The discharge pressure oil of the pump 37 introduced to the port is introduced to the unload valve 47 through the pipe 47*a*. The output pressure oil of the unload valve 47 is discharged to the port 47*b*. The discharge port 46*a* of the main relief valve 46 and the discharge port 47*b* of the unload valve 47 are in communication with each other and are connected to the drain circuit 48.

In FIG. 4, the discharge port 47*b* also serves as a discharge port of the back pressure valve 54. Details would be described later but it should be noted that the returning pressure oil of the high-pressure specified operation valve block 61 is connected to the input port 54*a* of the back pressure valve 54. The returning pressure oil connected to the input port 54*a* is discharged to the port 47*b* which is also a discharge port of the unload valve 47 through the back pressure valve 54. The pressure oil discharged from the back pressure valve 54 merge the pressure oil discharged from the main relief valve 46 and the unload valve 47 and is connected to the drain circuit 48.

Figure 5:
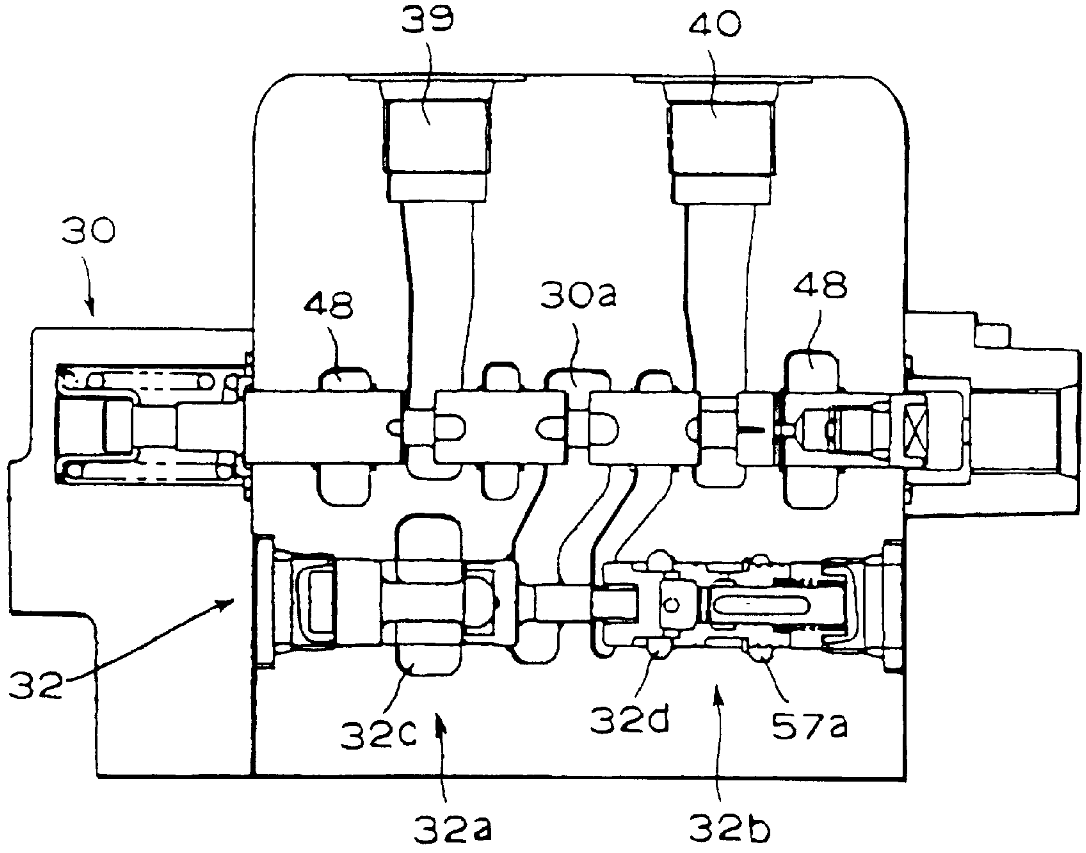
FIG. 5 is a sectional view taken along the line C—C in FIG. 2.

FIG. 5 is a sectional view taken along the line C—C in FIG. 2 showing the low-pressure specified operation valve block 62. The low-pressure specified operation valve block 62 includes the low-pressure specified operation valve 30 and the pressure compensation valve 32. The low-pressure side output port 65*c* of the pressure reducing valve 38 is introduced to the input port 32*c* of the flow control valve 32*a* of the pressure compensation valve 32. The pressure oil introduced to the input port 32*c* is output to the output port 32*e* of the flow control valve 32*a*. The output port 32*e* is connected to the pump port 30*a* of the operation valve 30. The pressure oil introduced to the pump port 30*a* of the operation valve 30 is output to the actuator port 39 or 40 by operating the operation valve. The output port 65*c* of the pressure reducing valve 38 is also connected to the input port 32*d* of the pressure reducing valve 32*b* of the pressure compensation valve 32. The pressure reducing valve 32*b* reduces the pressure of the pressure oil of the input port 32*d* and outputs the pressure oil to the low-pressure side LS pipe by the load pressure of the actuator.

Although it is not illustrated, a structure of the high-pressure specified operation valve block 61 is the same as that of the low-pressure specified operation valve block 62 shown in FIG. 5. In the present invention, specifications such as flow rate and pressure of the high-pressure specified operation valve block 61 is greater as compared with the low-pressure specified operation valve block 62. Therefore, the size as a block is greater than the low-pressure specification operation valve block 62.

Figure 6:
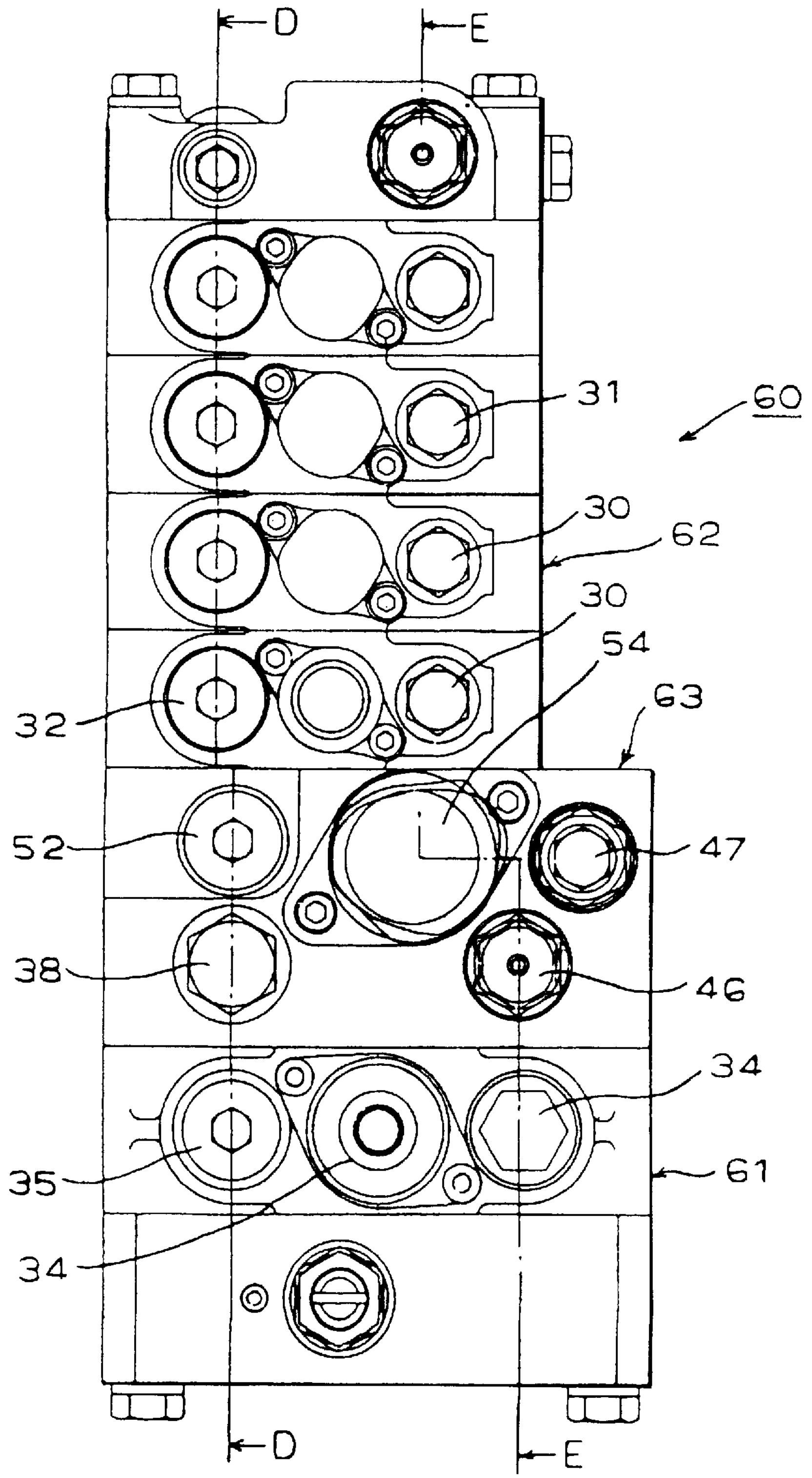
FIG. 6 is a view as viewing the operation valve block assembly as indicated by the arrow F in FIG. 2.

FIG. 6 is a left side view as viewing the operation valve block assembly 60 from the arrow F. In the precedence valve block 63, the main relief valve 46 and the precedence valve 38 are provided substantially in parallel to an end surface of the high-pressure specified operation valve block 61. By arranging in this manner, a volume of the precedence valve block 61 including the main relief valve, the unload valve, the precedence valve and the pressure reducing valve can be made small.

Figure 7:
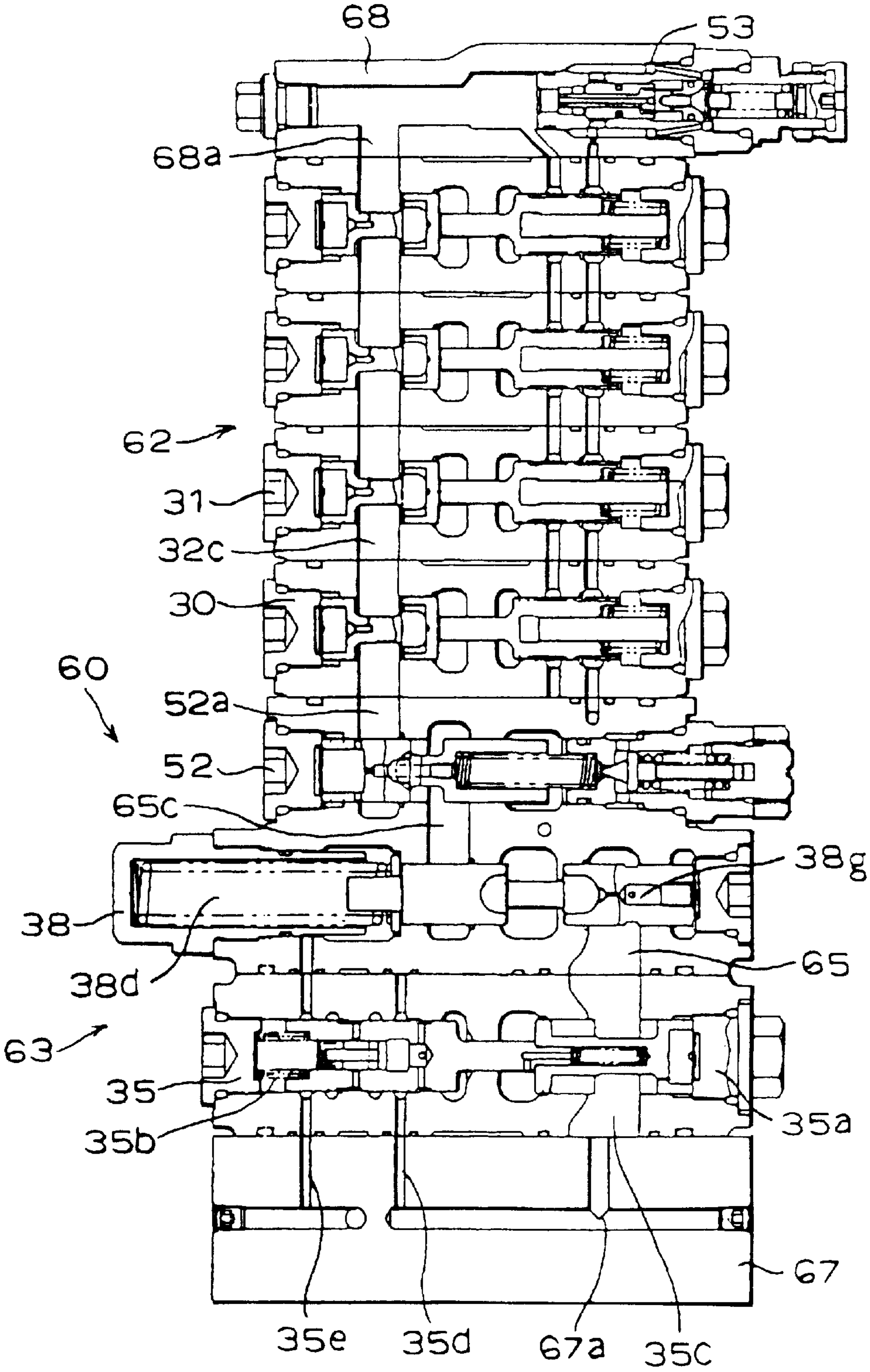
FIG. 7 is a sectional view taken along the line D—D in FIG. 6.

FIG. 7 is a sectional view taken along the line D—D in FIG. 6 showing the operation block assembly 60. In the precedence valve block 60, the precedence valve 38 is provided on the lower side in FIG. 7. The pressure reducing valve 52 is provided on the upper side. The precedence valve 38 and the pressure reducing valve 52 are disposed substantially perpendicular to an end surface on the side of the high-pressure specified operation valve block 63 (high-pressure side end surface, hereinafter) or an end surface on the side of the low-pressure specified operation valve block 62 (low-pressure side end surface, hereinafter) of the precedence valve block 60. On the high-pressure side end surface, a high-pressure side output port 65*b* (38*b*) of the precedence valve 38 is opened and in communication with the pump pressure port 35*a* of the pressure compensation valve 35 of the high-pressure specified operation valve block 63. On the low-pressure side end surface, the output port 52*a* of the pressure reducing valve is opened and in communication with the pump pressure port 35*c* of the pressure compensation valve 30 of the low-pressure specified operation valve block 62.

In the present invention, a high-pressure side cover 67 is provided on an end surface opposite from the precedence valve block 60 of the high-pressure specified operation valve block 63. On the high-pressure side cover, a pipe 67*a* opened at the pump pressure introducing port 35*c* of the pressure compensation valve of the high-pressure specified operation valve block 6*d* is provided. This pipe is connected to the pump pressure port 35*d* of the pressure reducing valve 35*b* of the high-pressure side pressure compensation valve 35. However, the high-pressure side cover is not indispensable, only if the pressure oil output form the high-pressure side output port 65*b* of the precedence valve 38 can be introduced to the flow control valve 35*a* and the pressure reducing valve 35*b* of the high-pressure side pressure compensation valve 35. A pipe may be provided in the high-pressure specified operation valve block 63. The high-pressure side output port 65*b* of the precedence valve 38 may be bifurcated.

The output port 35*d* of the pressure reducing valve 35*b* of the high-pressure pressure compensation valve 35 is in communication with a spring chamber 38*d* of the precedence valve 38. A pressure of the high-pressure side output port 65*b* is introduced to the pilot chamber 38*e* of the precedence valve 38. A small hole 38*g* of a spool 38*f* of the precedence valve 38 is opened to the high-pressure side output port 65*b*. The pressure oil is introduced from the small hole to the pilot chamber 38*e* through a pipe provided in the spool 38*f*. With the above structure, the precedence valve 38 is operated.

In the present invention, a low-pressure side cover 68 is provided on an end surface opposite from the precedence valve block 60 of the low-pressure side circuit. The low-pressure side cover 68 is the uppermost member in FIG. 7. Like the high-pressure side cover, the low-pressure side cover 68 includes a pipe 68*a* opened at the pump pressure introducing port 32*c* of the low-pressure side pressure compensation valve 32. This pipe is connected to the pump pressure port 32*d* of the pressure reducing valve 32*b* of the high-pressure side pressure compensation valve 32. The relief valve 53 which determines the maximum pressure of the low-pressure side circuit 33 is provided in the low-pressure side cover. Like the high-pressure side cover, the low-pressure side cover is not indispensable, only if the pressure oil output from the output port 52*a* of the pressure reducing valve 52 can be introduced into the flow control valve 32*a* and the pressure reducing valve 32*b* of the low-pressure side pressure compensation valve 32. A pipe may be provided in the low-pressure specified operation valve block 62.

Figure 8:
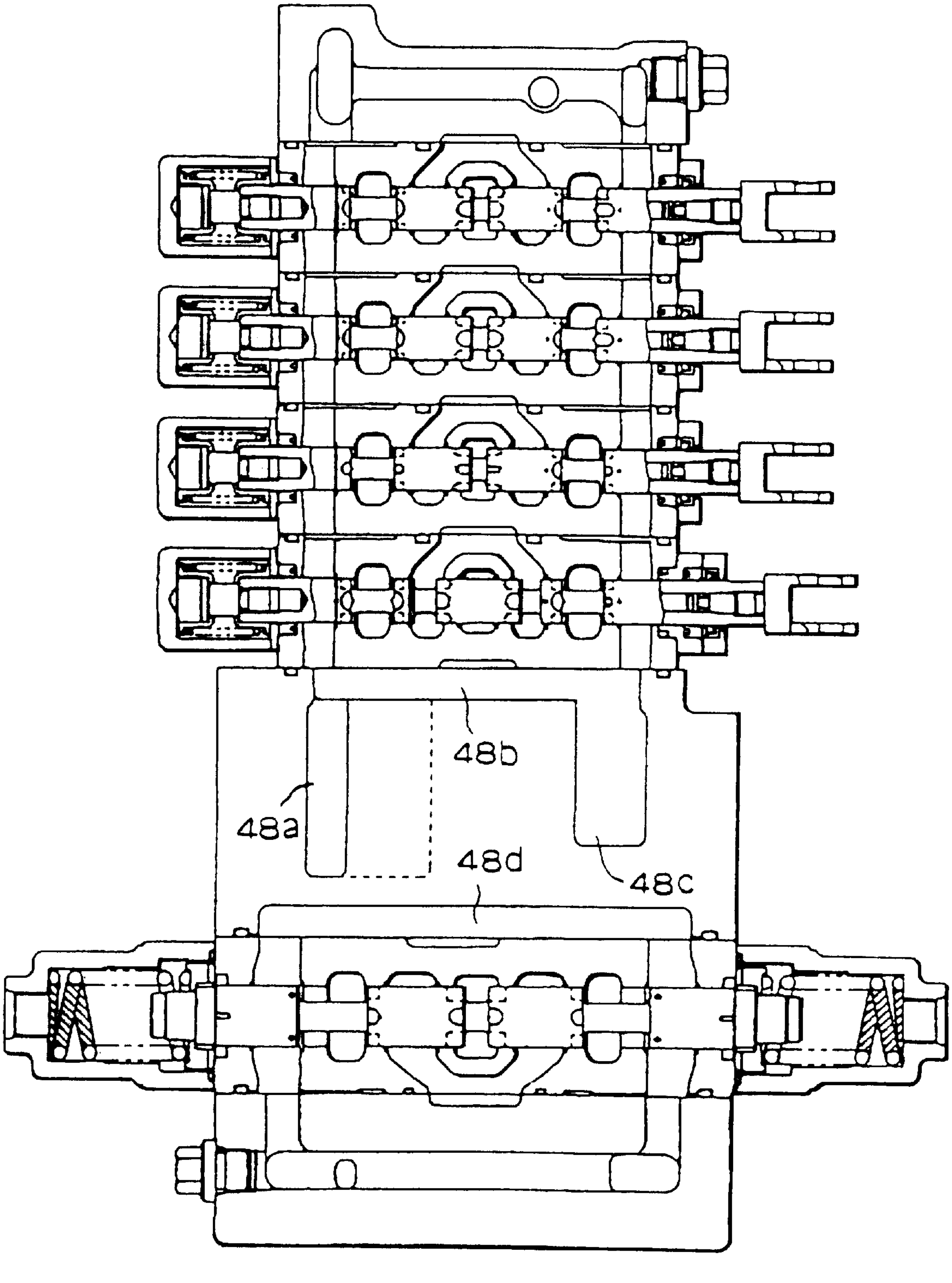
FIG. 8 is a sectional view taken along the line E—E in FIG. 6.
Figure 9:
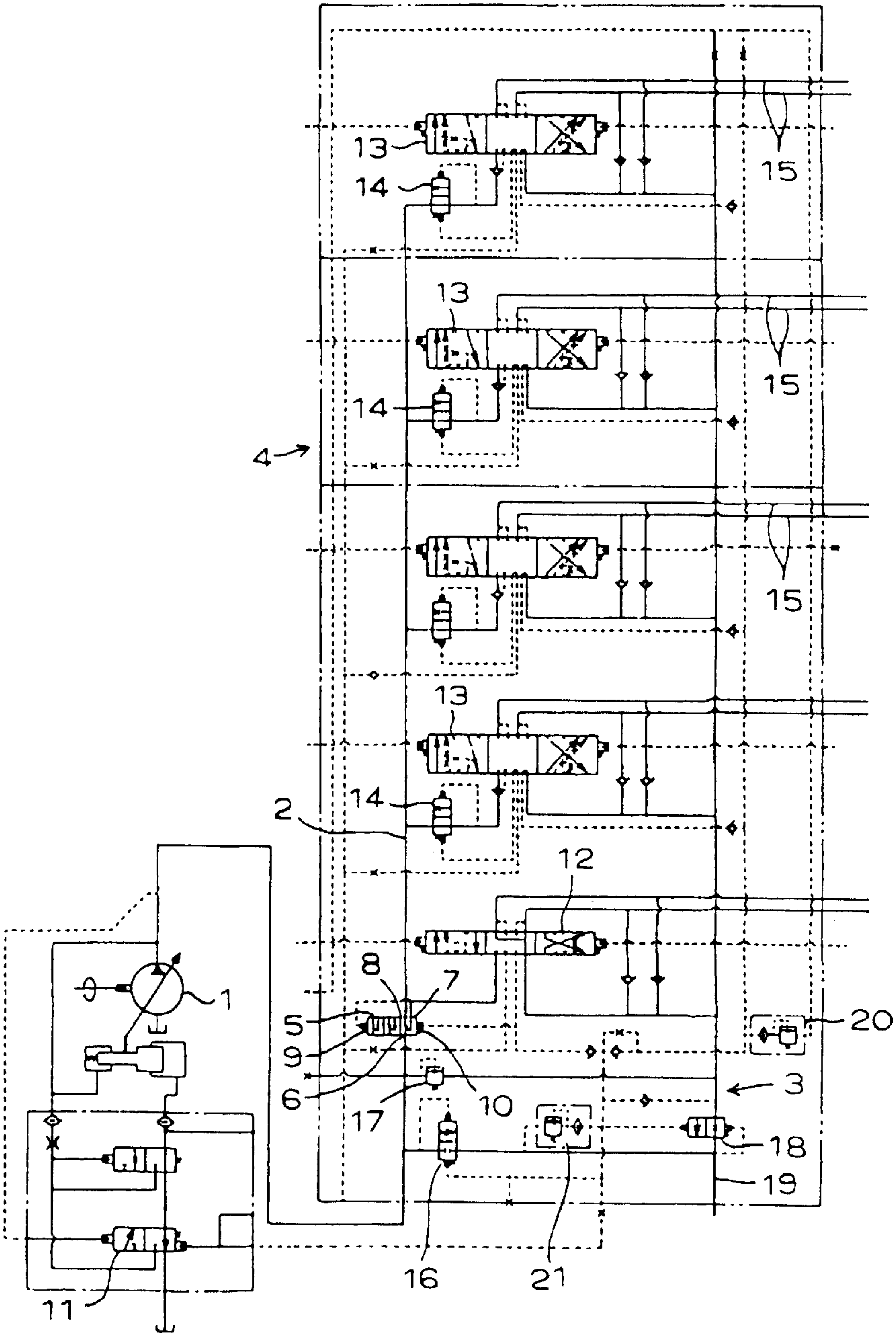
FIG. 9 is a diagram of a conventional hydraulic circuit.

FIG. 8 is a sectional view taken along the line E—E in FIG. 6, and shows a drain circuit. Pressure oil discharged from the main relief valve 46 and the unload valve 47 of the precedence valve block 60 is discharged to the port 48*a*. The pressure oil discharged to the port 48*a* flows into the port 48*b* provided in the low-pressure side end surface. The port 48*b* is in communication with port 48*c*. The discharged pressure oil introduced to the port 48*c* is discharged outside of the precedence valve block 60 through a communication pipe (not shown), and circulated to the tank through a hose (not shown). The port 48*b* opens into a tank port of the low-pressure specified operation valve block 62. As shown in FIG. 8, tank ports of the low-pressure specified operation valve blocks 62 are in communication with one another. The tank ports are in communication with one another in the low-pressure side cover also. Therefore, the returning pressure oil of the low-pressure side circuit is circulated from the port 48*c* of the precedence valve block 60 into the tank.

The tank port of the high-pressure specified operation valve 34 is in communication with the port 48*d* of the precedence valve block 60. The tank ports of the high-pressure specified operation valve 34 are in communication with one another in the high-pressure side cover also. The pressure oil introduced to the port 48*d* is introduced into the back pressure valve 54. The port 48*d* is in communication with the back pressure input port 54*a* shown in FIG. 4. The pressure oil introduced to the back pressure input port 54*a* is discharged to the discharge port 47*b* of the unload valve 47, and is discharge to the port 48*a*.

According to the above structure, the precedence valve block 63 is of a simple structure having the pump port 63*a* provided in the upper surface of the precedence valve block 63, the high-pressure side output port 38*b* of the precedence valve 38 provided in the high-pressure side end surface, and the output port 52*a* of the pressure reducing valve 52 provided in the low-pressure side end surface. Therefore, it is easy to connect the high-pressure specified operation valve block 63 and the low-pressure specified operation valve block 62 to each other. In the present invention, the number of the high-pressure specified operation valve block 61 is one, but it is possible to freely provide more high-pressure specified operation valve blocks if necessary like the low-pressure specified operation valve blocks 62. Further, when the operation valve blocks are connected, piping is not required. Further, since operation blocks of minimum but necessary size can be connected, it is possible to reduce the operation valve block assembly 60 both in size and weight.

Further, according to the hydraulic circuit of the present invention, it is possible to distribute a pressure oil discharged from the single pump 37 to the low-pressure side circuit 33 and the high-pressure side circuit 36 having different pressure and flow rate. Therefore, it is easy to form a hydraulic circuit in which operation valves having different specifications of pressure and flow rate.

What is claimed is:

1. A precedence valve block 63 which is of substantially rectangular parallelepiped shape and provided in one surface thereof with a pump pressure input port 63*a*, comprising a main relief valve 46 for limiting a pressure of said pump pressure input port, a precedence valve 38 for outputting a pressure oil introduced into said pump pressure input port into two ports 65*c*, 65*b*, and a pressure reducing valve 52 for reducing output pressure of one of said two ports, wherein said precedence block is provided in a surface adjacent said one surface with an output port of said pressure reducing valve, the other one of said two ports is formed in a surface opposed to said surface having said output port of said pressure reducing valve, said main relief valve and said precedence valve are disposed in a surface which is substantially parallel to said surface having said other port, and said precedence valve and said pressure reducing valve are disposed in a surface which is substantially perpendicular to said surface having said other port.

2. A precedence block according to claim 1, further comprising an unload valve, wherein a plane formed by said unload valve and said pressure reducing valve is substantially parallel to a plane formed by said main relief valve and said precedence valve.

3. An operation valve block assembly in which a plurality of blocks respectively having operation valves are coupled to one another as one unit, comprising a high-pressure specified operation valve block 63 having a high-pressure specified operation valve 61, a low-pressure specified operation valve block 63 having low-pressure specified operation valve 30, and a precedence valve block 63, wherein said precedence valve block is disposed between said high-pressure specified operation valve block and said low-pressure specified operation valve block, said precedence valve block comprises a precedence valve, a pressure reducing valve and a pump pressure input port, said precedence valve is a valve for outputting pressure fluid introduced into said pump pressure input port into two output ports, one of said two output ports is formed in an end surface (high-pressure side end surface, hereinafter) connected to said high-pressure specified operation valve block, the other one of said two output ports is connected to said pressure reducing valve, and an end surface (low-pressure side end surface, hereinafter) connected to said low-pressure specified operation valve block is provided with pressure fluid output from said pressure reducing valve.

4. An operation valve block assembly according to claim 3, wherein a high-pressure side pressure compensation valve is disposed in said high-pressure specified operation valve block, a low-pressure side pressure compensation valve is disposed in said low-pressure specified operation valve block, said output port formed in said high-pressure side end surface of said precedence valve block is in communication with pump pressure introducing ports of said high-pressure side pressure compensation valve, a signal output port of said high-pressure side pressure compensation valve is in communication with a pilot pressure receiving portion of said precedence valve, and said output port formed in said low-pressure side end surface of said precedence block is in communication with pump pressure introducing ports of said low-pressure side pressure compensation valve.

* * * * *